(12) United States Patent
Caldwell et al.

(10) Patent No.: US 6,713,713 B1
(45) Date of Patent: Mar. 30, 2004

(54) LENS TO ADAPT LASER INTENSITY FOR UNIFORM WELDING

(75) Inventors: Scott Caldwell, Fairport, NY (US); Craig Birrittella, Rochester, NY (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 10/323,151

(22) Filed: Dec. 18, 2002

(51) Int. Cl.$^7$ ................................................ B23K 26/00
(52) U.S. Cl. ............................... 219/121.63; 219/121.83
(58) Field of Search ........................ 219/121.63, 121.83, 219/121.6

(56) References Cited

U.S. PATENT DOCUMENTS

| | | | |
|---|---|---|---|
| 3,382,343 A | * 5/1968 | Muncheryan | .......... 219/121.63 |
| 4,636,609 A | 1/1987 | Nakamata | |
| 4,856,871 A | * 8/1989 | Van Sant | .................... 359/820 |
| 6,124,568 A | * 9/2000 | Broderick et al. | .. 219/137 WM |

* cited by examiner

Primary Examiner—M. Alexandra Elve
(74) Attorney, Agent, or Firm—Harness, Dickey & Pierce, P.L.C.

(57) ABSTRACT

A laser welding lens assembly for welding a first article to a second article at a weld zone includes a laser source outputting a laser beam. An optical fiber is operably coupled to the laser source to receive and transmit the laser beam. A lens is then positioned to receive the laser beam from the optical fiber. The lens includes a contoured face that is shaped to refract the laser beam to produce a generally uniform temperature profile across the weld zone.

33 Claims, 7 Drawing Sheets

LENS TO ADAPT LASER INTENSITY FOR UNIFORM WELDING

FIELD OF THE INVENTION

The present invention relates generally to welding and, more particularly, relates to an improved method and apparatus for producing uniform welding.

BACKGROUND OF THE INVENTION

Laser welding is commonly used to join plastic or resinous parts, such as automobile thermoplastic parts, at a welding zone. An example of such use of lasers can be found in U.S. Pat. No. 4,636,609, which is expressly incorporated herein by reference.

As is well known, lasers provide a focused beam of electromagnetic radiation at a specified frequency (i.e., coherent monochromatic radiation). There are a number of types of lasers available; however, infrared lasers or non-coherent sources provide a relatively economical source of radiative energy for use in heating a welding zone. One particular example of infrared welding is known as Through-Transmission Infrared Welding (TTIR). TTIR welding employs an infrared laser capable of producing infrared radiation that is directed by fiber optics, waveguides, or light guides through a first plastic part and into a second plastic part. This first plastic part is often referred to as the transmissive piece, since it generally permits the laser beam from the laser to pass therethrough. However, the second plastic part is often referred to as absorptive piece, since this piece generally absorbs the radiative energy of the laser beam to produce heat in the welding zone. This heat in the welding zone causes the transmissive piece and the absorptive piece to be melted and thus welded together. However, the heat produced by conventional laser systems often fail to provide a consistent, reliable, and esthetically pleasing weld, which can lead to excessive waste and/or increased production costs.

Radiative energy produced by the infrared laser can be delivered to the targeted weld zone through a number of transmission devices—such as a single optical fiber, a fiber optic bundle, a waveguide, a light guide, or the like—or simply by directing a laser beam at the targeted weld zone. In the case of a fiber optic bundle, the bundle may be arranged to produce either a single point source laser beam, often used for spot welding, or a generally linearly distributed laser beam, often used for a linear weld. Each of these arrangements and transmission devices suffer from a number of disadvantages inherent in their designs.

By way of example, a single optical fiber typically produces an output beam having a generally-Gaussian laser intensity—the center of the targeted weld zone receives an increased concentration of radiative energy relative to the outer edges of the weld zone. This increased concentration of radiative energy near the center of the weld zone often causes the center of the weld zone to become overheated, resulting in disadvantageous "bubbling" and/or out-gassing in the center area of the weld zone.

However, this overheating and the resultant "bubbling" and/or outgassing in the center area of the weld zone is not overcome simply by using a fiber optic bundle. Although it is known that a fiber optic bundle causes the generally-Gaussian or parabolic laser intensity output from a single optic fiber to be substantially normalized to produce an overall, generally uniform, laser intensity output, the center area of the weld zone is still often overheated. In the art, this overall, generally uniform, laser intensity output from a fiber optic bundle is known as a "top hat" distribution, which is a relatively accurate representation in near-field applications.

However, what is not readily appreciated in the art today is that although a generally-uniform laser intensity output can be achieved using a fiber optic bundle, such uniform intensity beams do not necessarily reduce the overheating, "bubbling", and/or out-gassing in the center area of the weld zone. Due to heat transfer principles, even with a uniform intensity beam, heat will build up faster in the center of the weld zone than along the edges of the weld zone.

Accordingly, there exists a need in the relevant art to provide an apparatus capable of producing an evenly distributed temperature profile throughout a target zone in order to produce a consistent weld joint. Furthermore, there exists a need in the relevant art to provide an apparatus capable of minimizing out-gassing or bubbling of a weld joint. Still further, there exists a need in the relevant art to provide an apparatus capable of redistributing radiative energy to the edge of a targeted weld zone to produce a more uniform temperature distribution. Additionally, there exists a need in the relevant art to provide an apparatus and method of using the same that is capable of overcoming the disadvantages of the prior art.

SUMMARY OF THE INVENTION

According to the principles of the present invention, a laser welding lens assembly for welding a first article to a second article at a weld zone is provided having an advantageous construction. The laser welding lens assembly includes a laser source outputting a laser beam. An optical fiber is operably coupled to the laser source to receive and transmit the laser beam. A lens is then positioned to receive the laser beam from the optical fiber. The lens includes a contoured face that is shaped to refract the laser beam to produce a generally uniform temperature profile across the weld zone.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
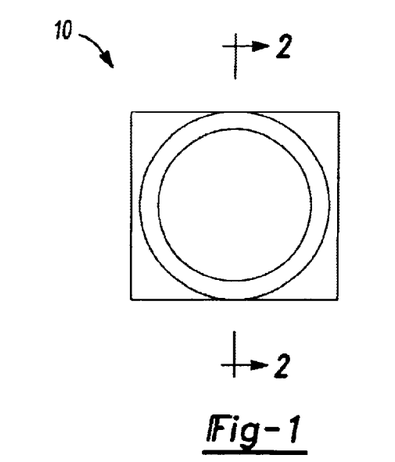
FIG. 1 is an end view illustrating a laser welding lens assembly according to a first embodiment of the present invention.
Figure 2:
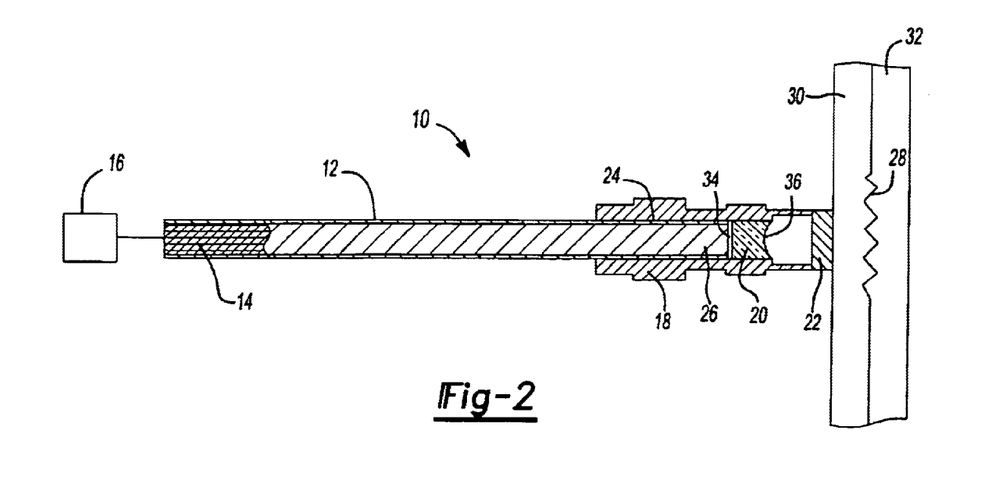
FIG. 2 is a cross-sectional view illustrating the laser welding lens assembly along line 2—2 of FIG. 1.

Referring now to the figures, a laser welding lens assembly, generally indicated at reference numeral 10, is provided according to a first embodiment of the present invention. As best seen in FIGS. 1 and 2, laser welding lens assembly 10 includes a fiber optic bundle 12 having a plurality of optical fibers 14 generally arranged in a circular pattern capable of carrying or transmitting radiative energy in the form of a laser beam therethrough. Fiber optic bundle 12 is operably coupled to a laser source 16, such as an infrared laser, according to known principles. Laser welding lens assembly 10 further includes a waveguide 18, a tailored lens 20, and a window 22. Waveguide 18 is coupled to fiber optic bundle 12 along an interface 24. Fiber optic bundle 12 terminates at an end 26 within waveguide 18 generally adjacent tailored lens 20. Tailored lens 20 is securely retained within waveguide 18 and is capable of redistributing the laser beam in a uniform temperature distribution across a weld zone 28, which will be discussed in detail below. Window 22 is coupled to an end of waveguide 18 and is retained therein to protect tailored lens 20 from environment contaminates and/or damage.

In operation, laser source 16 outputs a laser beam that is carried by fiber optic bundle 12. This laser beam passes through tailored lens 20 and is redistributed to achieve a uniform temperature distribution across weld zone 28. The laser beam then exits waveguide 18 and passes through a first plastic part 30, also known as a transmissive piece. Transmissive piece 30 generally permits the laser beam to pass therethrough. The laser beam is then absorbed by a second plastic part 32, also known as an absorptive piece. Absorptive piece 32 generally absorbs the radiative energy of the laser beam to produce heat in weld zone 28. This heat causes transmissive piece 30 and absorptive piece 32 to be melted and thus welded together.

Still referring to FIGS. 1 and 2, as described above, tailored lens 20 is capable of redistributing the laser beam in a uniform temperature distribution across weld zone 28. This allows for uniform welding across weld zone 28 and, thus, prevents overheating, bubbling, and/or out-gassing at or near weld zone 28. The actual cross-sectional design of tailored lens 20 is unique in that it redistributes the laser beam to achieve increased intensity along the edges of weld zone 28 to in turn achieve a uniform temperature distribution across weld zone 28.

Figure 3:
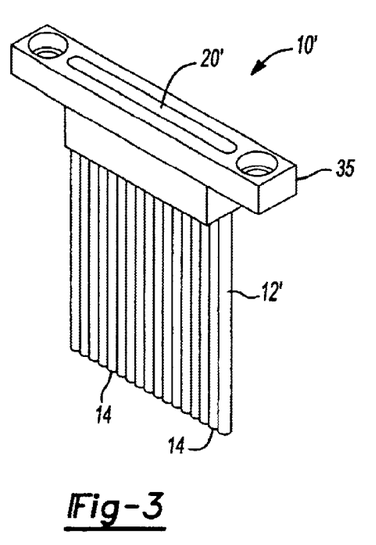
FIG. 3 is a perspective view illustrating a laser welding lens assembly according to a second embodiment of the present invention.
Figure 4:
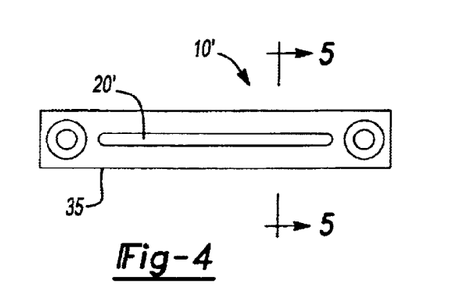
FIG. 4 is an end view illustrating the laser welding lens assembly according to the second embodiment of the present invention.
Figure 5:
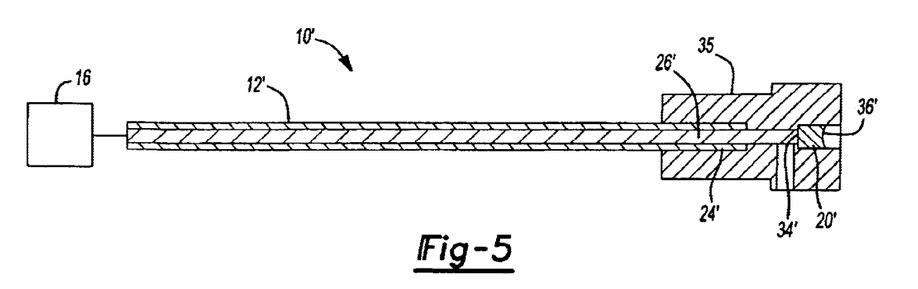
FIG. 5 is a cross-sectional view illustrating the laser welding lens assembly along line 5—5 of FIG. 4.

Turning now to FIGS. 3–5, a laser welding lens assembly, generally indicated at reference numeral 10', is provided according to a second embodiment of the present invention. As best seen in FIGS. 1 and 2, laser welding lens assembly 10' includes a fiber optic bundle 12' having a plurality of optical fibers 14 generally arranged in a side-by-side arrangement capable of carrying or transmitting radiative energy in the form of a laser beam therethrough. Fiber optic bundle 12' is operably coupled to laser source 16 according to known principles. Laser welding lens assembly 10' further includes a linear weld waveguide 34 and a tailored lens 20'. Linear weld waveguide 35 is coupled to fiber optic bundle 12' along an interface 24'. Fiber optic bundle 12' terminates at an end 26' within linear weld waveguide 35 generally adjacent tailored lens 20'. Tailored lens 20' is securely retained within linear weld waveguide 34 and is capable of redistributing the laser beam in a uniform temperature distribution across an elongated weld zone 28, which will be discussed in detail below.

In operation, laser source 16 outputs a laser beam that is carried by fiber optic bundle 12'. This laser beam passes through tailored lens 20' and is redistributed into a uniform temperature distribution. The laser beam then exits linear weld waveguide 35 and passes through a first plastic part 30, also known as a transmissive piece. Transmissive piece 30 generally permits the laser beam to pass therethrough. The laser beam is then absorbed by a second plastic part 32, also known as an absorptive piece. Absorptive piece 32 generally absorbs the radiative energy of the laser beam to produce heat in weld zone 28. This heat causes transmissive piece 30 and absorptive piece 32 to be melted and thus welded together. Laser welding lens assembly 10' is capable of producing an elongated laser beam adapted for linear welding applications due to the elongated shape of tailored lens 20'.

As described above, tailored lens 20, 20' are capable of redistributing the laser beam in a uniform temperature distribution across weld zone 28. This allows for uniform welding across weld zone 28 and, thus, prevents overheating, bubbling, and/or out-gassing at or near weld zone 28.

With particular reference to FIGS. 1 and 2, tailored lens 20 is generally cylindrical in shape and includes a flat face 34 and a contoured face 36. Similarly, with reference to FIGS. 3–5, tailored lens 20' is generally elongated in shape and includes a flat face 34' and a contoured face 36'. It should be understood that flat face 34, 34' may also be contoured in order to achieve the desired laser beam distribution. The shape of contoured face 36, 36' is determined through a process of mapping input light ray positions to output light ray positions, which yield the same temperature distribution.

Figure 6:
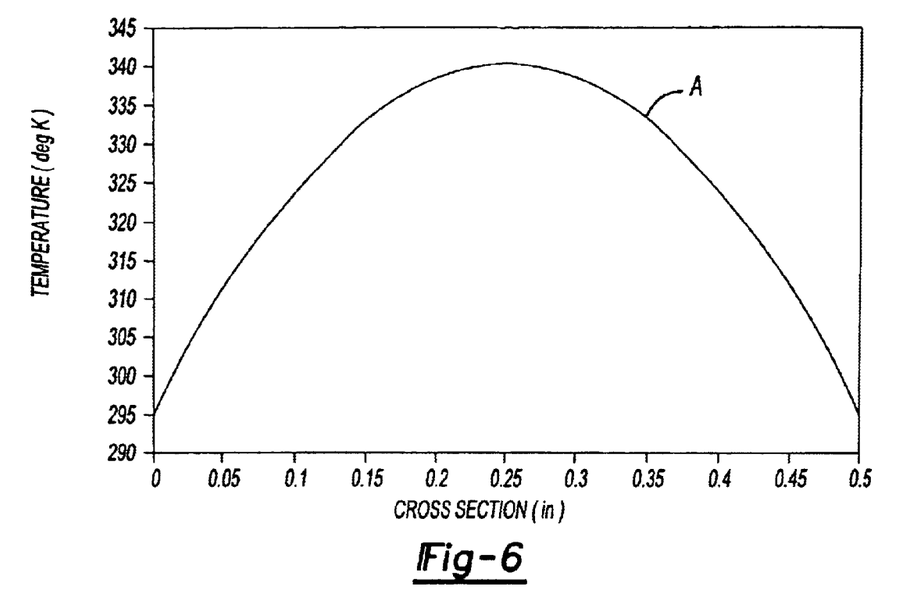
FIG. 6 is a graph illustrating a temperature distribution for a uniform intensity, spot welding, laser beam.
Figure 7:
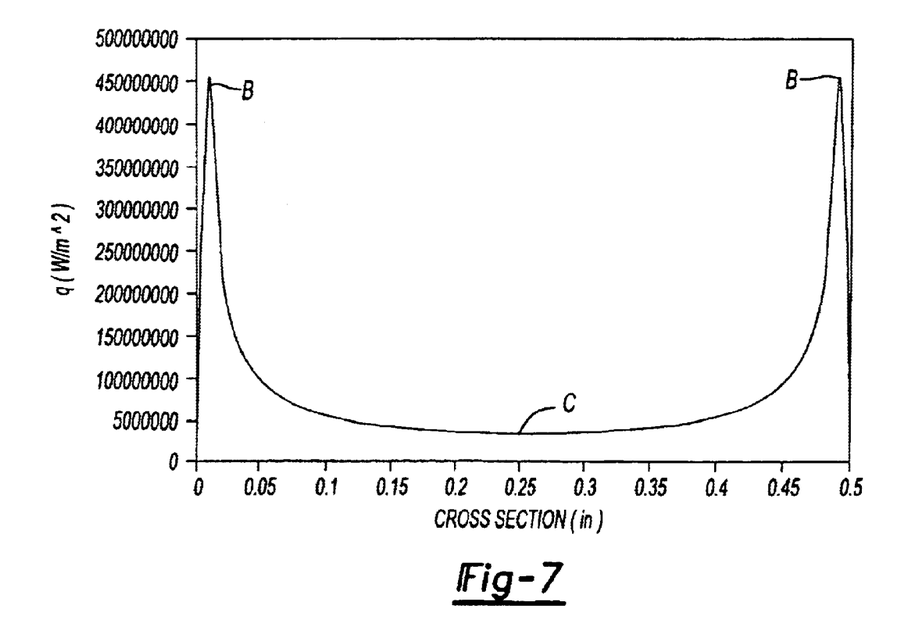
FIG. 7 is a graph illustrating a laser intensity distribution normalized for uniform temperature for a spot welding laser beam.

This process of determining the exact contour of contoured face 36, 36' will now be discussed in reference to a single application. With particular reference to FIG. 6, a temperature distribution graph is provided that illustrates the temperature distribution of a uniform-intensity laser beam exiting fiber optic bundle 12, without the use of tailored lens 20. It should be appreciated that this temperature distribution is generally-parabolically shaped and, thus, has a higher temperature A in the middle of the distribution than along the edges. This higher temperature in the middle of the distribution may cause the aforementioned overheating, bubbling, and/or out-gassing at or near weld zone 28. However, in order to achieve a uniform temperature distribution across weld zone 28, it is first necessary to employ a finite element analysis (FEA) program to determine the necessary intensity distribution capable of achieving a uniform temperature distribution. Accordingly, as seen in FIG. 7, a laser intensity distribution graph is produced that illustrates the laser intensity distribution (q) necessary to achieve a uniform temperature (T) at weld zone 28. As can be seen from peaks B and valley C of FIG. 7, it is necessary to direct increased laser intensity to the outer edges of the weld zone 28, since according to heat transfer principles these outer edges of weld zone 28 require additional laser intensity to raise their temperature as they are surrounded by unheated (i.e. cooler) areas. However, the center of weld zone 28 requires comparatively less laser intensity because it is surrounded by heated areas and, thus, will heat up more quickly.

In order to derive the light intensity output at the weld ($q_x$) for a desired uniform welding temperature (T), it is necessary to use the following formula:

$$q_x = q^*(T-T_0)/(T_x-T_0)$$

where $q_x$ is the desired light intensity output at a given x position, q is the starting uniform light intensity used in the FEA program, T is the desired uniform welding temperature, $T_x$ is the temperature at a given x position derived from the FEA program, and $T_0$ is the ambient temperature. If we then assume that the input light has parallel rays, we then use the actual intensity of the input light at a given x position to map the input light ray positions to the output light ray positions to yield a uniform temperature distribution.

Figure 8:
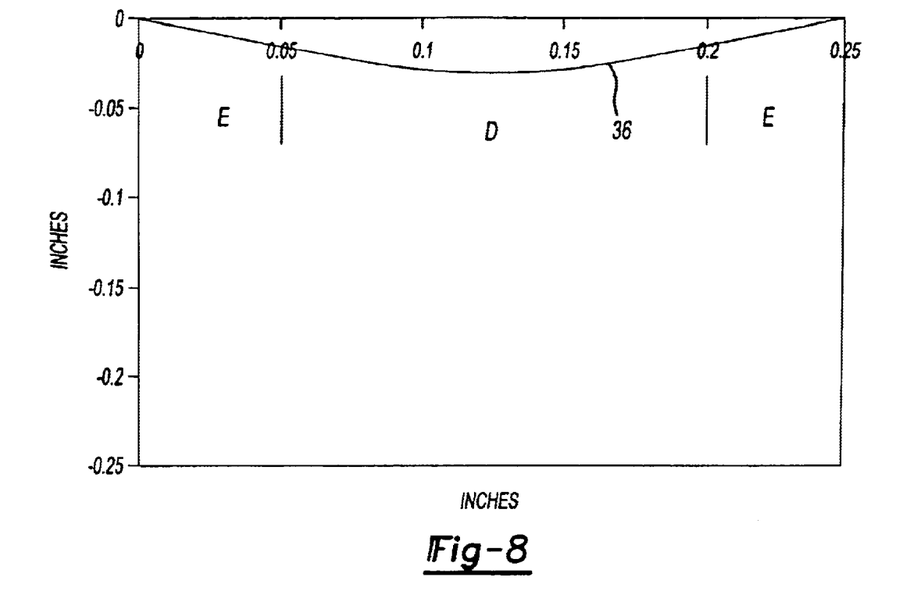
FIG. 8 is a graph illustrating a preferred lens shape for a spot weld capable of achieving a uniform temperature distribution according to the principles of the present invention.

It is then necessary to calculate the lens slope at a given x position. needed for a given index of refraction to bend the input light ray to the desired output light ray position. These slopes are then integrated to define the lens shape as seen in FIG. 8. With particular reference to FIG. 8, we can see the desired lens shape for a generally-Gaussian distributed input laser beam is a generally concave, divergent lens. However, with closer inspection of the preferred shape of contoured face 36 we see that the preferred shape for this particular application is actually a complex shape—including both convex and concave portions. That is, we can see that the center portion of the curve in FIG. 8 is generally concave shaped between about 0.05 inches and 0.2 inches having an increasing slope outwardly from its center (generally indicated at D). However, the portion of the curve between about 0–0.05 inches and 0.2–0.25 inches is generally convex having a decreasing slope as we travel outwardly from the center concave portion (generally indicated at E). The particular shape of contoured face 36, however, is dependent upon the particular application parameters set forth in the above equation and thus may vary.

Figure 9:
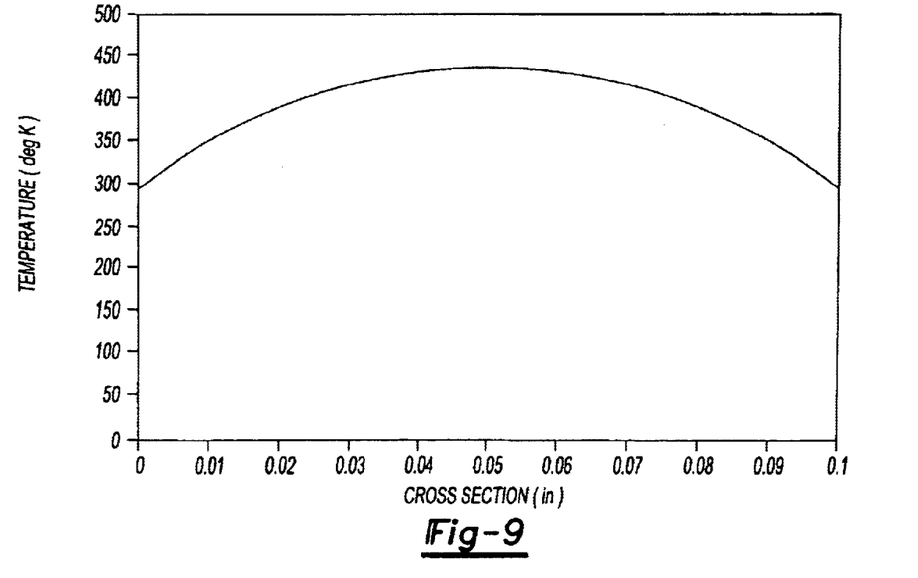
FIG. 9 is a graph illustrating a temperature distribution for a uniform intensity, linear welding, laser beam.
Figure 10:
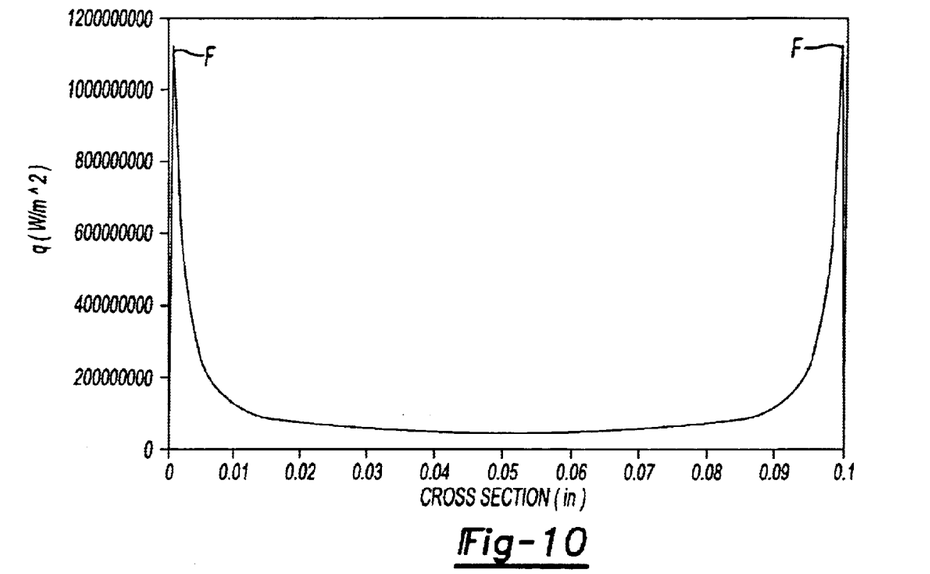
FIG. 10 is a graph illustrating a laser intensity distribution normalized for uniform temperature for a linear welding laser beam.
Figure 11:
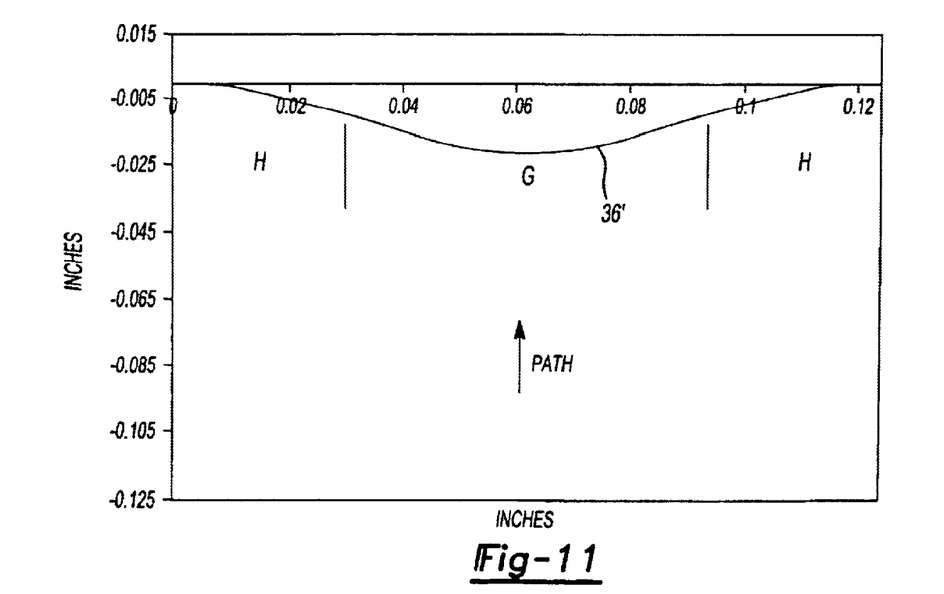
FIG. 11 is a graph illustrating a preferred lens shape for a linear weld capable of achieving a uniform temperature distribution according to the principles of the present invention.

Applying the above analysis and computation to laser welding lens assembly 10' (linear weld application), we see from FIG. 9 that the initial temperature distribution curve for a uniform laser intensity (q) is slightly different than that set forth in FIG. 6. However, we can still see the characteristic domed curve. Accordingly, in order to achieve a generally uniform temperature distribution, it is necessary to redistribute the laser light to the edges, as seen by peaks F in FIG. 10. Applying the above equation and computation, a lens shape is again determined for the specific application (in this case, a linear weld) as seen in FIG. 11. As can been seen in FIG. 10, contoured face 36' is again a complex shape—including both convex and concave portions. That is, the center portion of contoured face 36' is generally concave shaped between about 0.03 inches and 0.09 inches having an increasing slope outwardly from its center (generally indicated at G). The portion of the curve between about 0–0.03 inches and 0.09–0.13 inches is generally convex having a decreasing slope as we travel outwardly from the center concave portion (generally indicated at H).

Preferably, tailored lens 20, 20' is made of a silicone material, however tailored lens 20, 20' may be made of any material typically used in lens construction, including glass, acrylic, plastic, polycarbonate, and the like. An advantage to using silicone, however, is the fact that tailored lens 20' and waveguide 24' can be made or mechanically curved to permit the welding around corners or into tight and/or complex areas. An additional advantage of using silicon is its ability to resist particulates or other debris from sticking thereto.

Figure 12:
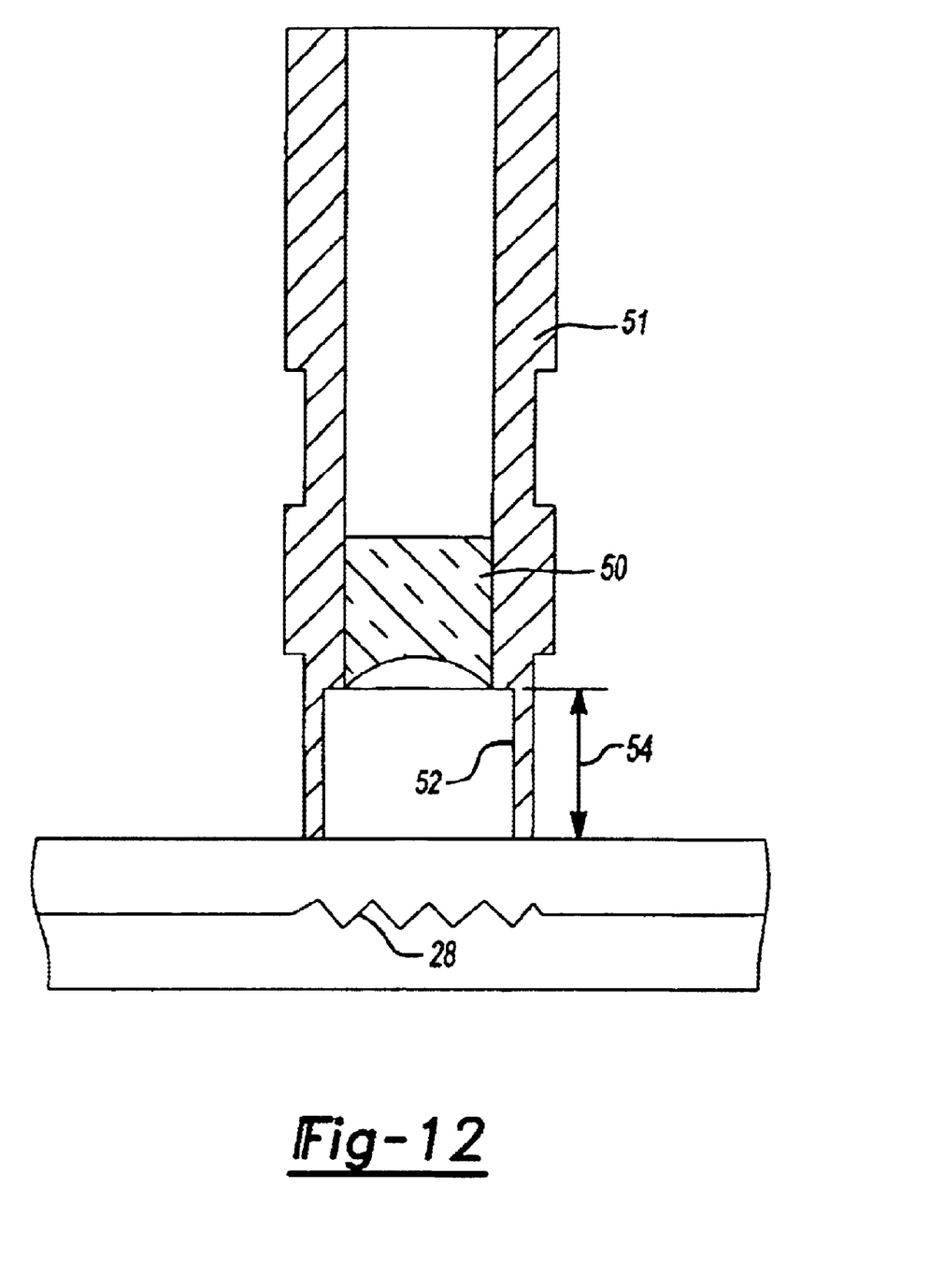
FIG. 12 is a cross-sectional view illustrating a laser welding lens assembly according to a third embodiment of the present invention.
Figure 13:
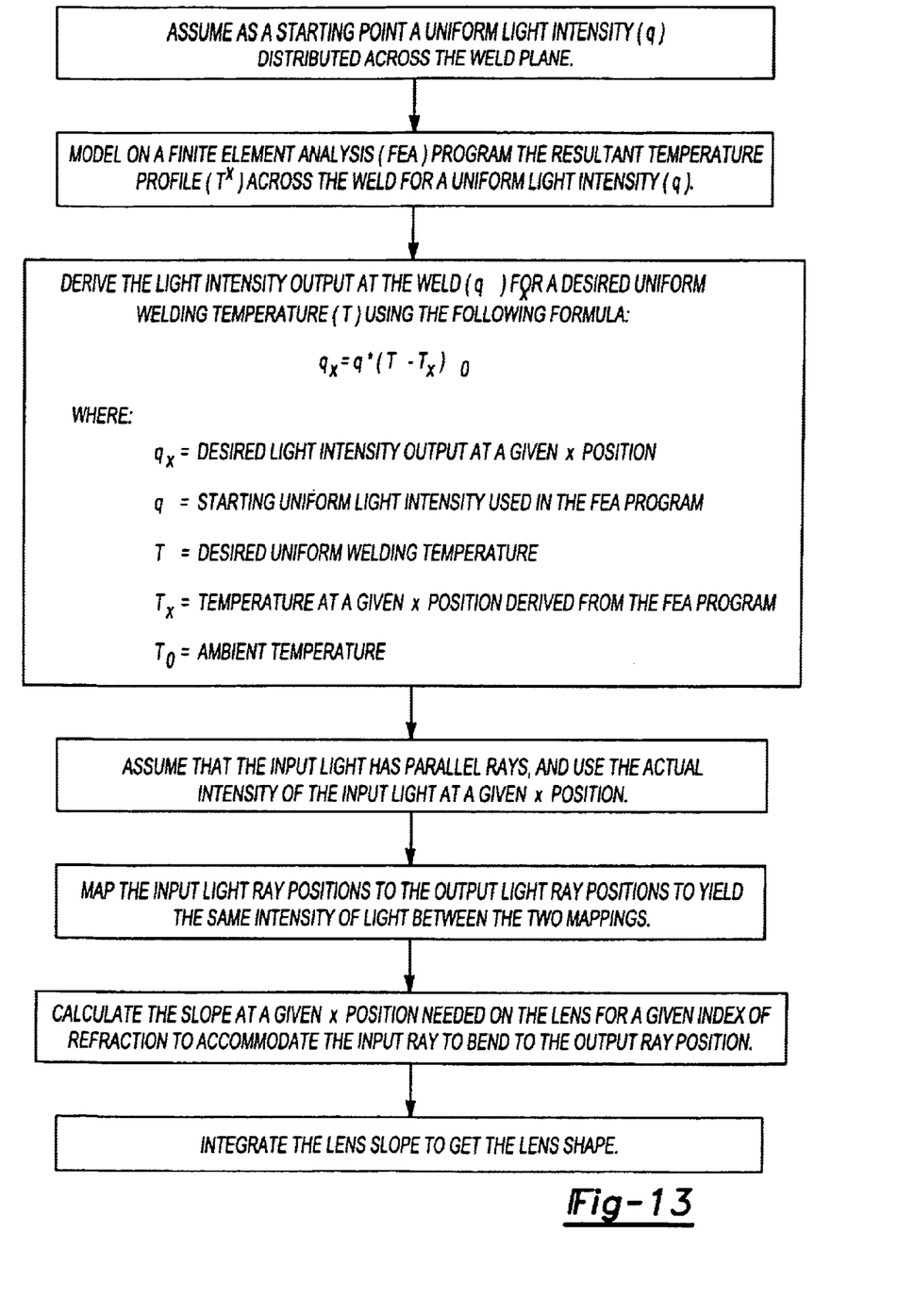
FIG. 13 is a flowchart illustrating the method steps of determining a lens shape capable of distributing a uniform temperature laser beam according to the principles of the present invention.

It should be appreciated that although it is preferred that the shape of contoured face 36, 36' is determined from an analysis and mapping of light intensity to a specific output position, it should be understood that many of the advantages of the present invention may be achieved using a concave divergent lens 50 in combination with a waveguide 51, as seen in FIG. 12. Concave divergent lens 50 may be a plano-concave, a concave-plano, concave-concave, or any other divergent lens system. The shape of concave divergent lens 50 and the length and inner diameter of waveguide 51 is selected such that as the laser beam exits concave divergent lens 50, the now cone-shaped laser beam reflects off an inner portion 52 of waveguide 51. A length 54 of waveguide downstream from concave divergent lens 50 is selected to permit only a predetermined portion of the cone-shaped laser beam to reflect off inner portion to produce a higher laser intensity distribution the edges of weld zone 28 than in the center of weld zone 28. Consequently, as discussed in connection with the previous embodiments, concave divergent lens 50 and waveguide 51 cooperate to tailor the appropriate laser intensity distribution necessary to achieve a uniform temperature distribution across weld zone 28.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser welding lens assembly for welding a first article to a second article at a weld zone, said laser welding lens assembly comprising:
   a laser source outputting a laser beam;
   an optical fiber being operably coupled to said laser source for receiving and transmitting said laser beam; and
   a lens being positioned to receive said laser beam from said optical fiber, said lens having a contoured face shaped to refract said laser beam to produce a generally uniform temperature profile across the weld zone.

2. The laser welding lens assembly according to claim 1 wherein said lens is a divergent lens.

3. The laser welding lens assembly according to claim 1 wherein said contoured face includes at least one concave portion and at least one convex portion.

4. The laser welding lens assembly according to claim 1 wherein the shape of said contoured face is determined by mapping input light ray positions to output light ray positions to yield a light intensity capable of achieving a generally uniform temperature profile.

5. The laser welding lens assembly according to claim 1, further comprising:
   a waveguide coupled to an end of said optical fiber, said waveguide retaining said lens therein.

6. The laser welding lens assembly according to claim 1 wherein said lens is made from a material chosen from the group consisting essentially of silicone, acrylic, plastic, polycarbonate, and glass.

7. The laser welding lens assembly according to claim 1 wherein said lens is generally circular.

8. The laser welding lens assembly according to claim 1 wherein said lens is generally elongated.

9. The laser welding lens assembly according to claim 8 wherein said elongated lens is generally flexible to enable said elongated lens to be curved to form a predetermined weld shape.

10. A laser welding lens assembly for welding a first article to a second article at a weld zone, said laser welding lens assembly comprising:
   a laser source outputting a laser beam;
   an optical fiber being operably coupled to said laser source for receiving and transmitting said laser beam; and
   a lens being positioned to receive said laser beam from said optical fiber, said lens having a contoured face shaped to refract said laser beam, wherein the shape of said contoured face is determined by mapping input light ray positions to output light ray positions to yield a light intensity capable of achieving a generally uniform temperature profile at the weld zone.

11. The laser welding lens assembly according to claim 10 wherein said lens is a divergent lens.

12. The laser welding lens assembly according to claim 10 wherein said contoured face includes at least one concave portion and at least one convex portion.

13. The laser welding lens assembly according to claim 10, further comprising:
   a waveguide coupled to an end of said optical fiber, said waveguide retaining said lens therein.

14. The laser welding lens assembly according to claim 10 wherein said lens is made from a material chosen from the group consisting essentially of silicone, acrylic, plastic, polycarbonate, and glass.

15. The laser welding lens assembly according to claim 10 wherein said lens is generally circular.

16. The laser welding lens assembly according to claim 10 wherein said lens is generally elongated.

17. The laser welding lens assembly according to claim 16 wherein said elongated lens is generally flexible to enable said elongated lens to be curved to form a predetermined weld shape.

18. A laser welding lens assembly for welding a first article to a second article at a weld zone, said laser welding lens assembly comprising:
   a laser source outputting a laser beam;
   a waveguide having a reflective inner surface; and
   a divergent lens disposed in said waveguide to define a downstream length of said reflective inner surface, said divergent lens being operable to receive said laser beam, said divergent lens having a contoured face shaped to refract said laser beam, wherein the shape of said contoured face and said downstream length of said reflective inner surface are selected to yield a light intensity distribution capable of achieving a generally uniform temperature profile at the weld zone.

19. The laser welding lens assembly according to claim 18 wherein said contoured face is concave.

20. The laser welding lens assembly according to claim 18, further comprising:
   an optical fiber being operably coupled between said laser source and said waveguide for receiving and transmitting said laser beam.

21. The laser welding lens assembly according to claim 18 wherein said lens is made from a material chosen from the group consisting essentially of silicone, acrylic, plastic, polycarbonate, and glass.

22. The laser welding lens assembly according to claim 18 wherein said lens is generally circular.

23. The laser welding lens assembly according to claim 18 wherein said lens is generally elongated.

24. The laser welding lens assembly according to claim 23 wherein said elongated lens is generally flexible to enable said elongated lens to be curved to form a predetermined weld shape.

25. A laser welding lens assembly for welding a first article to a second article at a weld zone, said laser welding lens assembly comprising:
   a laser source outputting a laser beam; and
   a lens being positioned to receive said laser beam from said laser source, said lens having a contoured face shaped to refract said laser beam to produce a generally uniform temperature profile across the weld zone.

26. The laser welding lens assembly according to claim 25 wherein said lens is a divergent lens.

27. The laser welding lens assembly according to claim 25 wherein said contoured face includes at least one concave portion and at least one convex portion.

28. The laser welding lens assembly according to claim 25 wherein the shape of said contoured face is determined by mapping input light ray positions to output light ray positions to yield a light intensity capable of achieving a generally uniform temperature profile.

29. The laser welding lens assembly according to claim 25, further comprising:
   an optical fiber disposed between said laser source and said lens for transmitting said laser beam, said optical fiber having a waveguide coupled to an end thereof, said waveguide retaining said lens therein.

30. The laser welding lens assembly according to claim 25 wherein said lens is made from a material chosen from the group consisting essentially of silicone, acrylic, plastic, polycarbonate, and glass.

31. The laser welding lens assembly according to claim 25 wherein said lens is generally circular.

32. The laser welding lens assembly according to claim 25 wherein said lens is generally elongated.

33. The laser welding lens assembly according to claim 32 wherein said elongated lens is generally flexible to enable said elongated lens to be curved to form a predetermined weld shape.

* * * * *